C. N. CLARK.
WAGON.
APPLICATION FILED SEPT. 14, 1921.
1,434,043.
Patented Oct. 31, 1922.
2 SHEETS—SHEET 1.
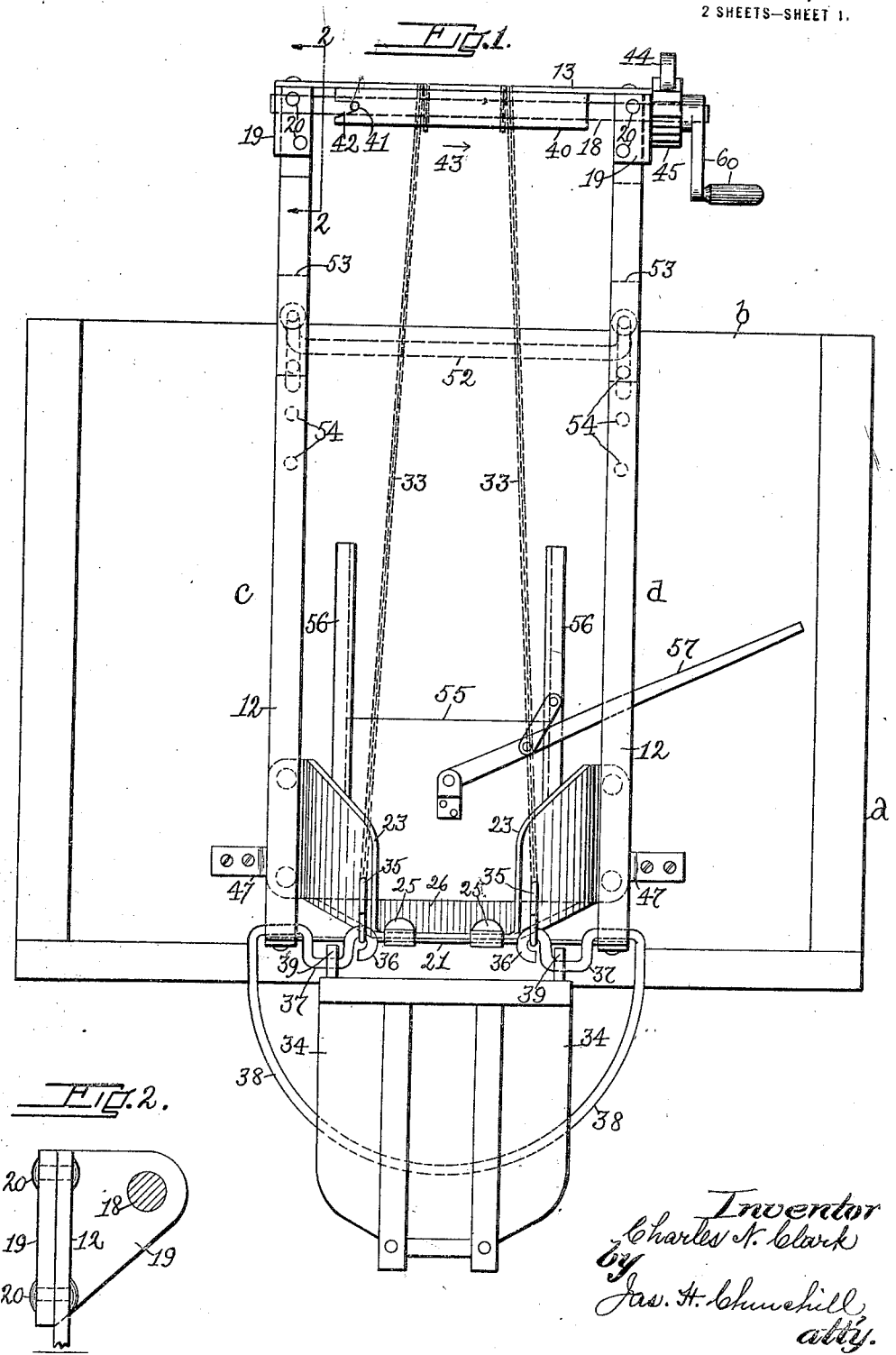
Inventor
Charles N. Clark
by
Jas. H. Churchill
atty.

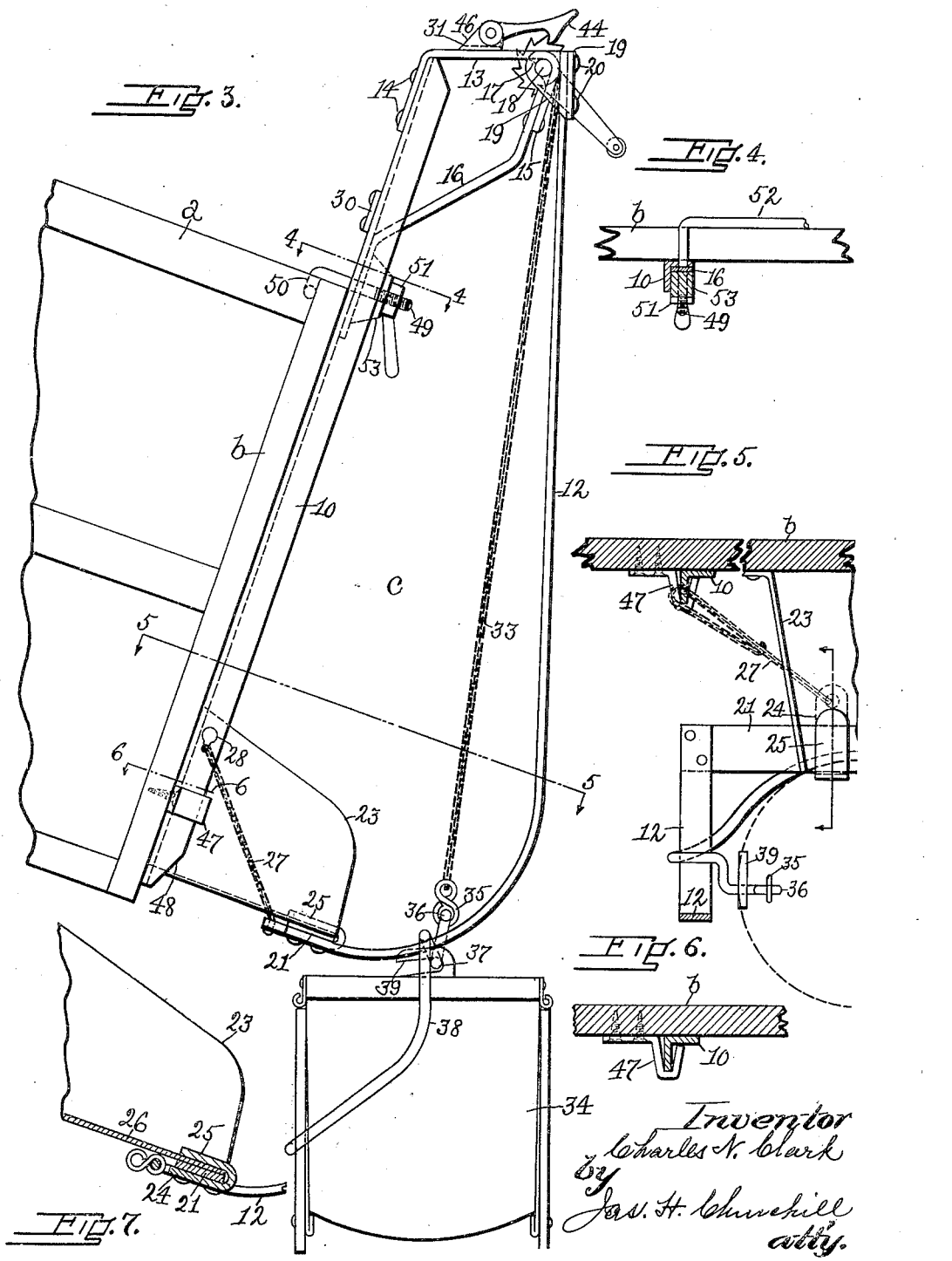

Patented Oct. 31, 1922.

1,434,043

UNITED STATES PATENT OFFICE.

CHARLES N. CLARK, OF SOMERVILLE, MASSACHUSETTS.

WAGON.

Application filed September 14, 1921. Serial No. 500,561.

*To all whom it may concern:*

Be it known that I, CHARLES N. CLARK, a citizen of the United States, residing in Somerville, in the county of Middlesex and State of Massachusetts, have invented an Improvement in Wagons, of which the following description, in connection with the accompanying drawings, is a specification, like characters on the drawings representing like parts.

This invention relates to a wagon for transporting and discharging coal, gravel and like material, and more particularly to mechanism for supporting a basket or like receptacle while the latter is being filled, and for elevating the filled basket into a convenient position for the operator to handle.

The invention further has for its object to provide a basket supporting and lifting mechanism, which is capable of being carried by the tail board of the wagon, and which may and preferably will be constructed to form a unit which is capable of being attached to and detached from the tail board.

Provision may be and preferably will be made for enabling the hoisting mechanism to be used with tail boards having chutes of different lengths attached to them.

The lifting or hoisting mechanism may and preferably will be constructed so that the basket may be returned from its elevated position to its lowered or filling position by gravity as will be described.

These and other features of this invention will be pointed out in the claims at the end of this specification.

Fig. 1 is a rear elevation of a wagon provided with a basket supporting and hoisting mechanism embodying this invention.

Fig. 2, a detail in section on the line 2—2, Fig. 1.

Fig. 3, a side elevation of the apparatus shown in Fig. 1.

Fig. 4, a detail in section on the line 4—4, Fig. 3.

Fig. 5, a detail in section on the line 5—5, Fig. 3.

Fig. 6, a detail in section on the line 6—6, Fig. 3, and

Fig. 7, a detail in section to illustrate the engagement of the movable front member with the chute attached to the tail board.

In the present instance is illustrated one embodiment of the invention which embodies the unitary feature of the apparatus, which enables it to be attached to and detached from the tail board of any coal or other similar wagon.

Referring to the drawings $a$ represents a coal wagon of any usual or desired construction and $b$ the tail board thereof.

The tail board $b$ may be of any suitable or desired construction and carries a basket supporting and hoisting mechanism, and in the present instance a preferred construction is shown, which consists of a framework, a windlass supported thereby, means for supporting the basket, and flexible means for connecting the basket supporting means with the windlass, whereby the basket may be hoisted from its lowered or filling position into an elevated position by winding said flexible means on the windlass.

The framework may and preferably will be constructed to cooperate with the usual chute attached to the tail board, and as said chutes vary in length on different wagons, the framework is made so that it can be adjusted with relation to said chutes to enable the basket in its lowered position to be properly positioned with respect to said chutes.

To this end the framework is provided with a member, which is attached to the tail board and may be designated the stationary member, and is further provided with a member which is movable with respect to the stationary member so that its lower end, which supports the basket when empty, may be moved toward and from the stationary member to properly position the empty basket with relation to the chute on the tail board.

The framework herein shown consists of sub-parallel side frames $c$, $d$, (see Figs. 1, 3, and 5) and each side frame comprises a back member 10, a front member 12 and a top member 13. The back member 10 is shown as an angle iron and the top and front members 13, 12 as pieces of flat iron or steel. The top member 13 is secured at its rear end by rivets 14 to the back member 10, and is bent at its front end to form an arm 15 to which is riveted a downwardly and rearwardly inclined brace or arm 16, having its lower end bearing against and spot welded or otherwise secured to the back member 10, and having a curved upper end 17 which cooperates with the bend in the top member 13 to form a bearing for a shaft 18, upon which the front member is mounted to turn or pivot. In the present instance, the front member 12 is pivotally mounted on the shaft 18 by an angle plate 19, (see Figs. 1, 2 and 3), which plate is secured to the front member 12 by rivets 20. The front member 12 is curved or bent at its lower end, and the said front members 12 of the side frame c, d, are connected at their lower ends by a cross bar 21, which is riveted thereto.

The cross bar 21 ties the front members 12 together so that they can be swung on the shaft 18 as one piece, and provision is made for securing the lower ends of the front members in operative relation to the usual stationary chute 23 attached to the tail board. To this end, the cross bar 21 has secured to it bent clips or devices 24, having fingers 25 extended across the cross bar 21 and separated therefrom by a sufficient space to permit the bottom 26 of the chute to enter said space and be frictionally gripped between the cross bar 21 and the fingers 25 as clearly represented in Figs. 3, 5 and 7.

The clips 24 are detachably secured to the back members 10 by chains 27, one end of the chains being attached to the said clips and the other end passed through eyes 28 in the back members 10 as represented in Figs. 3 and 5. The back members 10 are tied together by one or more cross bars 30 and the top members 13 are connected together by a cross bar 31.

The shaft 18 constitutes one form of windlass, and is connected by chains 33 or like flexible means with a supporting device or member for a basket 34, and in the present instance the chains 33 are provided with eyes 35, which engage hooks 36 on arms 37 which engage and slide upon the inner surfaces of the front members 12 of the framework, and have their ends, which project beyond the front members 12, connected by a cross bar or member 38, which is preferably curved to engage the rear side or surface of the basket 34 to steady the same when elevated and lowered. The basket 34 is provided with suitable hooks 39 which detachably engage the arms 37. The chains 34 may be wound upon the shaft 18 or, as is preferred and herein shown, may be wound on a sleeve or drum 40, which is loose on the shaft 18 and is capable of being coupled with the shaft to rotate therewith or of being uncoupled therefrom to rotate independently thereof.

The sleeve 40 may be coupled to the shaft 18 by a pin 41 on the shaft 18 entering a slot 42 in one end of the sleeve, as shown in Fig. 1.

By reference to Fig. 1, it will be seen that by moving the sleeve 40 on the shaft in the direction of the arrow 43, sufficiently to disengage it from the pin 41, the sleeve is rendered loose on the shaft so as to turn thereon while the latter is held stationary by a holding pawl 44. This arrangement is of advantage as it provides for a quick return by gravity of the empty basket to its filling position, as will be described. The holding pawl 44 engages a ratchet wheel 45 on the shaft 18. The pawl 44 is pivoted to a lug 46 on the cross bar 31.

The basket hoisting or lifting apparatus above described may be permanently attached to the wagon and preferably to the tail board b, but it is preferred to detachably secure it to the tail board, and in the present instance a simple and quickly operated method of attaching it to the tail board is employed. To this end, the tail board b has attached to it devices for engaging the lower ends of the back members 10, which devices are shown as hooks 47, which have their free ends separated from the tail board a sufficient distance to permit the back members 10 to be slipped behind the hooks 47, by moving the framework downward from above the said hooks.

The back members 10 may and preferably will be provided with inclined lower ends 48 to facilitate engagement of the back members with the holding devices or hooks 47 (see Fig. 3).

The upper portion of the framework may be secured to the tail board by hook-shaped devices having arms 49 which are designed to extend over the upper surface of the tail board, and having arms 50 which are designed to engage the inner surface of said tail board.

The arms 49 are made long enough to extend through the back members 10 and are threaded at their ends to receive hand nuts 51. The arms 50 of the hook-shaped devices may be connected by a cross bar 52 which engages the inner surface of the tail board. The hook-shaped devices and the connecting bar 52 may be made of a single piece of metal rod suitably bent at its ends.

The back members 10 may be reenforced at the parts through which the threaded arms 49 are extended, by blocks 53 against which the nuts 51 bear, and said back members 10 may be provided with a plurality of holes 54 for the passage of the threaded arms 49, so as to enable the hoisting apparatus to be adjusted to tail boards of different heights.

From the above description, it will be seen that the hoisting apparatus as a unit can be quickly and easily attached to and detached from the tail board of the wagon.

The tail board b is provided with the usual outlet opening for the discharge of the coal into the chute 23, which opening is normally closed by a slide or valve 55 movable in guides 56 and which is shown as raised and lowered by a lever 57 (see Fig. 1).

The hoisting apparatus herein shown is applicable to coal wagons of all kinds and particularly to those whose bodies are elevated at their front ends to facilitate the discharge of the coal into the basket, and such a wagon body is represented.

The hoisting apparatus, when applied to such a wagon, enables the load to be delivered by one man, to wit: the driver of the wagon.

In operation, the basket 34 is automatically filled when in its lowered position shown in Figs. 1 and 3 by manipulating the lever 57 to open the discharge opening in the tail board.

When the basket is filled or loaded, the operator turns a handle 60 on the shaft 18 to wind the chains 33 upon the windlass 40 and draw the loaded basket up into a suitable position to be transferred to the back of the operator, which is easily done by the operator backing up to the elevated basket and then after grasping the basket walking away from the hoisting apparatus, so as to disengage the hooks 39 from the hoisting apparatus.

When the operator returns to the wagon with the empty basket, he engages the hooks 39 with the arms 37 and then moves the sleeve 40 in the direction of the arrow 43 so as to uncouple the sleeve from the shaft 18, whereupon the basket can descend by gravity to its lowered or filling position. The descent of the basket may be regulated by the operator restraining rotation of the sleeve more or less with his hand or otherwise.

When the empty basket has been lowered into its filling position, the sleeve 40 is again coupled with the shaft 18 and the apparatus is again in condition to hoist the basket and its next load.

It will be observed that the return of the empty basket to its filling position is quickly accomplished, and as a result the wagon may be unloaded in a minimum time.

It will further be observed that the wagon can be unloaded with a single operator with a minimum of labor on his part, and in practice it has been found that a single operator can unload the wagon with less labor and in less time than was required by two men formerly.

The hoisting apparatus is not only beneficial to the operator, but also to his employer as it shortens the time of delivering a load, and lessens the number of men employed to deliver a given quantity of coal per day. Furthermore it is of advantage when two men go with the wagon, as both can carry the coal from the wagon to the bin and the number of loads delivered per day is increased.

The apparatus is furthermore simple, relatively light and easily handled, and is highly efficient in use.

It will be observed that by turning back the nuts 51, the hoisting apparatus is free to be removed from the tail board, which is effected by moving the apparatus upwardly until the beveled lower ends 48 of the back members register with the hooks 47, whereupon the apparatus can be tilted away from the tail board and removed therefrom.

It is to be observed that the windlass employed to hoist the basket is shown as carried by the tail board of the wagon, by means of the framework, which is detachably secured thereto, and while this arrangement is preferred it is not desired to limit the invention in this respect.

One embodiment of the invention is herein shown, but it is not desired to limit the invention to the particular construction shown.

Claims:

1. In a wagon, in combination, a wagon body, a tail board co-operating therewith, a lifting mechanism carried by said tail board, to be supported thereby and a supporting member connected with said lifting mechanism to be elevated thereby.

2. In a wagon, in combination, a wagon body, a tail board co-operating therewith, a windlass carried by said tail board, and a basket supporting mechanism connected with said windlass to be raised thereby.

3. In a wagon, in combination, a wagon body, a tail board co-operating therewith, a framework secured to said tail board, a windlass carried by said framework, and basket supporting means connected with said windlass to be elevated thereby.

4. In a wagon, in combination, a wagon body, a tail board co-operating therewith, a framework, a hoisting mechanism carried by said framework, and means for detachably securing said framework to said tail board.

5. In a wagon, in combination, a wagon body, a tail board co-operating therewith, a framework, a basket supporting member, a hoisting mechanism for said basket supporting member carried by said framework, and means adjustable on said framework for securing it to the tail board.

6. In combination, a framework consisting of side frames spaced apart and connected together, and each comprising a front member, a back member, and a top member, a rotatable shaft supported by said top member, a sleeve on said shaft movable longitudinally thereon, means for coupling said sleeve with said shaft, a basket supporting member co-operating with the front members of said side frames to be guided thereby, flexible means for connecting said basket supporting member with said sleeve, and means for holding said shaft from rotation in one direction.

7. In a wagon, in combination, a wagon body, a tail board therefor provided with an outlet opening for the material carried by the wagon, a basket supporting member normally arranged below the level of said opening to permit a basket thereon to receive the material passing out through said opening, a windlass carried by said wagon above said opening, flexible means connecting said windlass with said supporting member to elevate the latter, and means for preventing rotation of the windlass in one direction to hold the supporting member in its elevated position while the basket is being removed therefrom.

8. In a wagon, in combination, a wagon body provided with a tail board, a framework located in rear of the said body and attached thereto to be carried thereby, a windlass mounted on said framework, a basket supporting member vertically movable with relation to said tail board, and flexible means connected with said basket supporting member and with said windlass to be wound upon the latter to elevate the said supporting member.

9. In a wagon, in combination, a wagon body, a framework located in the rear of the said body and attached thereto to be carried thereby, a windlass mounted on said framework, a basket supporting member connected with said windlass to be elevated thereby and co-operating with said framework to be guided thereby while it is being elevated.

10. In a wagon, in combination, a wagon body, a framework located in rear of the said body and attached thereto to be carried thereby, a windlass mounted on said framework, a basket supporting member connected with said windlass to be elevated thereby, and means for detachably securing said framework with said wagon.

11. In a wagon, in combination, a wagon body, a framework attached thereto to be carried thereby outside thereof, a basket supporting member movable lengthwise of said framework in contact therewith to be guided thereby, and means carried by said framework for elevating said basket supporting member independently of said framework.

12. In a wagon, in combination, a wagon body, a rtotatable shaft carried thereby, a sleeve mounted on said shaft, means for coupling said sleeve to said shaft to rotate therewith and to permit the sleeve to rotate independently of said shaft, a basket supporting member, and means for connecting said member with said sleeve.

13. In a wagon, in combination, a wagon body, and a basket hoisting apparatus attached thereto to be removed therefrom as a unit, and comprising a framework, a windlass mounted thereon, a basket supporting member, and means for connecting the said member with said windlass.

14. In a wagon, in combination, a wagon body provided with a tail board having an opening therein, a windlass supported by said wagon body, a basket supporting member located below said windlass and the opening in said tail board, and flexible means connecting said member with said windlass.

15. In a wagon, in combination, a wagon body, a windlass supported thereby, a basket supporting member, flexible means connecting said basket supporting member with said windlass, and a basket provided with devices for suspending it from said supporting member and for permitting it to be removed therefrom while said basket is on the back of the operator.

16. In a wagon, in combination, a wagon body, a tail board co-operating therewith, and a hoisting unit detachably secured to said tail board to be supported thereby, and having a windlass, a basket supporting member and a flexible member connecting said basket supporting member with said windlass.

17. In a wagon, in combination, a wagon body, a tail board co-operating therewith, and a hoisting unit secured to said tail board and having a front member movable toward and from said tail board.

18. In a wagon, in combination, a wagon body, a tail board co-operating therewith and provided with a discharge opening, a chute attached to said tail board and co-operating with said opening, and a hoisting unit carried by said wagon and having a front member movable toward and from said tail board, and means for securing said movable front member in fixed relation to said chute.

19. A hoisting unit for wagons comprising a back member, a top member, a rotatable shaft carried by said top member, and a front member mounted to turn on said shaft.

20. A hoisting unit for wagons comprising a framework, a windlass supported thereby, a basket supporting member, flexible means for connecting said supporting member with said windlass, and means for detachably securing said framework to the tail board of a wagon.

In testimony whereof, I have signed my name to this specification.

CHARLES N. CLARK.